(12) United States Patent
Saitama

(10) Patent No.: US 7,608,656 B2
(45) Date of Patent: Oct. 27, 2009

(54) EMULSION PRESSURE-SENSITIVE ADHESIVE AND PROCESS FOR PRODUCING THE SAME

(75) Inventor: Kiyokuni Saitama, Sayama (JP)

(73) Assignee: Soken Chemical & Engineering Co., Ltd., Tokyo (JP)

(*) Notice: Subject to any disclaimer, the term of this patent is extended or adjusted under 35 U.S.C. 154(b) by 0 days.

(21) Appl. No.: 12/028,984

(22) Filed: Feb. 11, 2008

(65) Prior Publication Data

US 2008/0146732 A1 Jun. 19, 2008

Related U.S. Application Data

(62) Division of application No. 10/547,040, filed as application No. PCT/JP2004/002381 on Feb. 27, 2004, now Pat. No. 7,375,161.

(30) Foreign Application Priority Data

Feb. 28, 2003 (JP) ............ 2003-054099
Feb. 28, 2003 (JP) ............ 2003-054100

(51) Int. Cl.
C08J 3/02 (2006.01)
C08K 3/20 (2006.01)
C08F 2/16 (2006.01)

(52) U.S. Cl. .......... 524/457; 524/458; 524/460; 524/560; 524/561

(58) Field of Classification Search ........ 524/457, 524/460, 458, 461, 560, 561
See application file for complete search history.

(56) References Cited

U.S. PATENT DOCUMENTS

| 4,721,748 | A | 1/1988 | Iovine et al. |
| 5,889,101 | A | 3/1999 | Schlarb et al. |
| 5,952,398 | A | 9/1999 | Dietz et al. |
| 6,187,861 | B1 | 2/2001 | Weitzel et al. |
| 7,317,056 | B2 * | 1/2008 | Yoshimura et al. ............ 526/78 |
| 2005/0090619 | A1 | 4/2005 | Yoshimura et al. |

FOREIGN PATENT DOCUMENTS

| JP | 46041472 A | 12/1971 |
| JP | 61264077 A | 11/1986 |
| JP | 63258913 A | 10/1988 |
| JP | 63274443 A | 11/1988 |
| JP | 4081405 A | 3/1992 |
| JP | 8239408 A | 9/1996 |
| JP | 9278927 A | 10/1997 |
| JP | 11193368 A | 7/1999 |
| JP | 11228927 A | 8/1999 |
| JP | 2001122911 A | 5/2001 |
| WO | WO 03057738 A1 | 7/2003 |

* cited by examiner

Primary Examiner—Nathan M Nutter
(74) Attorney, Agent, or Firm—The Webb Law Firm

(57) ABSTRACT

A process for producing an emulsion pressure-sensitive adhesive includes (co)polymerizing a main monomer in the presence of a protective colloid, the protective colloid being an acrylic copolymer including (A-1) at least one hydrophilic monomer selected from the group consisting of acrylamide, methacrylamide, hydroxyethyl acrylate and hydroxyethyl methacrylate and (B-1) an alkyl (meth)acrylate that is copolymerizable with the hydrophilic monomer (A-1) and whose alkyl group has 4 to 18 carbon atoms, or (A-2) a hydrophilic monomer being acrylic acid and/or methacrylic acid and (B-2) an alkyl (meth)acrylate that is copolymerizable with the hydrophilic monomer (A-2) and whose alkyl group has 4 to 9 carbon atoms; the hydrophilic monomer and the alkyl (meth)acrylate being copolymerized in a weight ratio in the range of 40-70:60-30; the acrylic copolymer having a weight-average molecular weight in the range of 500 to 50000.

12 Claims, No Drawings

EMULSION PRESSURE-SENSITIVE ADHESIVE AND PROCESS FOR PRODUCING THE SAME

CROSS-REFERENCE TO RELATED APPLICATIONS

This application is a division of U.S. patent application Ser. No. 10/547,040 filed Aug. 26, 2005, now U.S. Pat. No. 7,375, 161 granted May 20, 2008, which is the natioal phase filing of International Patent Application No. PCT/JP2004/002381 filed Feb. 27, 2004, both of which are incorporated by reference herein in their entirety.

FIELD OF THE INVENTION

The present invention relates to a process for producing an emulsion pressure-sensitive adhesive using a protective colloid and to an emulsion pressure-sensitive adhesive and, more particularly, to a process for stably producing an emulsion pressure-sensitive adhesive in the presence of a protective colloid comprising a specific hydrophilic monomer, and to an emulsion pressure-sensitive adhesive obtainable by the process.

BACKGROUND OF THE INVENTION

Polymerization of unsaturated compounds such as vinyl acetate, (meth)acrylates, (meth)acrylic acids and styrenes dispersed in an aqueous solvent is frequently performed in a manner such that the unsaturated compound is finely dispersed into an emulsion with use of a surface active agent and/or a water-soluble high molecular weight compound, followed by the reaction.

For the hydrophobic unsaturated compound to stably disperse in the aqueous medium, the surface active agent or water-soluble high molecular compound used in forming an emulsion must possess high hydrophilicity. The surface active agent or water-soluble high molecular weight compound used for dispersing the unsaturated compound adheres to the periphery of fine polymers of the unsaturated compound. The residual surface active agent or water-soluble high molecular weight compound adhered to the periphery of polymer particles causes a lowering of the water resistance of the resultant polymer.

When importance is placed on the water resistance of polymer produced, the stability in the reaction system is deteriorated in a manner such that the unsaturated compound in the aqueous medium shows lowered dispersion stability and the polymer particles precipitate during the reaction.

Reaction of the unsaturated compound in an emulsion state requires that the unsaturated compound is stably dispersed and that the surface active agent or water-soluble high molecular weight compound does not lower the water resistance of polymer particles even if it adheres to the periphery of polymer particles after completion of the reaction. However, it is difficult for conventional surface active agents or water-soluble high molecular weight compounds to satisfy such conflicting requirements.

To avoid the problems encountered in polymerizing the unsaturated compounds in aqueous mediums, JP-A-H08-239408 discloses polymerization of a monomer in an aqueous emulsion in the presence of a high-molecular weight protective colloid having a weight-average molecular weight of not less than 20000, wherein the high-molecular weight protective colloid comprises (I) an ethylenically unsaturated monomer having an acid group or an acid anhydride group, (II) a (meth)acrylic ester of an aliphatic alcohol having 10 or more carbon atoms, (III) a main monomer selected from $C_{1-9}$ alkyl (meth)acrylates, vinyl esters of carboxylic acids having 20 or less carbon atoms, ethylenically unsaturated nitriles, vinyl halides and aliphatic hydrocarbons having 2 to 8 carbon atoms and 1 or 2 double bonds and (IV) another monomer.

JP-A-2001-122911 discloses a method of emulsion polymerization of unsaturated compounds having an ethylenically unsaturated group, wherein the method employs a protective colloid of a homopolymer of N-vinylcarboxylic amide such as N-vinylacetamide or a water-soluble copolymer of N-vinylcarboxylic amide and a compound copolymerizable with the N-vinylcarboxylic amide.

The use of the protective colloid can improve the dispersion stability of the polymer, but a problem occurs in that the resulting polymer obtained using the protective colloid has an insufficient adhesive property relative to wet surfaces.

SUMMARY OF THE INVENTION

It is an object of the present invention to provide a process for producing an emulsion pressure-sensitive adhesive, whereby good dispersion stability of monomers and polymers can be achieved and whereby the polymer obtained can form a pressure-sensitive adhesive exhibiting excellent adhesive property to wet surfaces.

It is another object of the present invention to provide an emulsion pressure-sensitive adhesive that shows superior adhesive property to wet surfaces in spite of being an emulsion type and that is produced with excellent dispersion stability of monomers and polymers.

A first process for producing an emulsion pressure-sensitive adhesive according to the present invention comprises (co)polymerizing a main monomer in the presence of a protective colloid, the protective colloid being an acrylic copolymer comprising:

(A-1) at least one hydrophilic monomer selected from the group consisting of acrylamide, methacrylamide, hydroxyethyl acrylate and hydroxyethyl methacrylate; and (B-1) an alkyl (meth)acrylate that is copolymerizable with the hydrophilic monomer (A-1) and whose alkyl group has 4 to 18 carbon atoms;

the hydrophilic monomer and the alkyl (meth)acrylate being copolymerized in a weight ratio in the range of 40-70: 60-30;

the acrylic copolymer having a weight-average molecular weight in the range of 500 to 50000.

A second process for producing an emulsion pressure-sensitive adhesive according to the present invention comprises (co)polymerizing a main monomer in the presence of a protective colloid, the protective colloid being an acrylic copolymer comprising:

(A-1) at least one hydrophilic monomer selected from the group consisting of acrylamide, methacrylamide, hydroxyethyl acrylate and hydroxyethyl methacrylate;

(B-1) an alkyl (meth)acrylate that is copolymerizable with the hydrophilic monomer (A-1) and whose alkyl group has 4 to 18 carbon atoms; and (C) a third monomer being acrylonitrile and/or styrene;

the hydrophilic monomer, the alkyl (meth)acrylate and the third monomer being copolymerized in a weight ratio (A-1): [(B-1)+(C)] in the range of 40-70:60-30 and in a weight ratio (B-1):(C) in the range of 99.9-20:0.1-80;

the acrylic copolymer having a weight-average molecular weight in the range of 500 to 50000.

A third process for producing an emulsion pressure-sensitive adhesive according to the present invention comprises (co)polymerizing a main monomer in the presence of a protective colloid, the protective colloid being an acrylic copolymer comprising:

(A-2) a hydrophilic monomer being acrylic acid and/or methacrylic acid; and (B-2) an alkyl (meth)acrylate that is copolymerizable with the hydrophilic monomer (A-2) and whose alkyl group has 4 to 9 carbon atoms;

the hydrophilic monomer and the alkyl (meth)acrylate being copolymerized in a weight ratio in the range of 40-70: 60-30;

the acrylic copolymer having a weight-average molecular weight in the range of 500 to 50000.

A fourth process for producing an emulsion pressure-sensitive adhesive according to the present invention comprises (co)polymerizing a main monomer in the presence of a protective colloid, the protective colloid being an acrylic copolymer comprising:

(A-2) a hydrophilic monomer being acrylic acid and/or methacrylic acid;

(B-2) an alkyl (meth)acrylate that is copolymerizable with the hydrophilic monomer (A-2) and whose alkyl group has 4 to 9 carbon atoms; and (C) a third monomer being acrylonitrile and/or styrene;

the hydrophilic monomer, the alkyl (meth)acrylate and the third monomer being copolymerized in a weight ratio (A-2): [(B-2)+(C)] in the range of 40-70:60-30 and in a weight ratio (B-2):(C) in the range of 99.9-20:0.1-80;

the acrylic copolymer having a weight-average molecular weight in the range of 500 to 50000.

A first emulsion pressure-sensitive adhesive according to the present invention comprises an aqueous medium and a (co)polymer dispersed in the aqueous medium, the (co)polymer being obtained by (co)polymerizing a main monomer in the presence of a protective colloid, the protective colloid being an acrylic copolymer comprising:

(A-1) at least one hydrophilic monomer selected from the group consisting of acrylamide, methacrylamide, hydroxyethyl acrylate and hydroxyethyl methacrylate; and (B-1) an alkyl (meth)acrylate that is copolymerizable with the hydrophilic monomer (A-1) and whose alkyl group has 4 to 18 carbon atoms;

the hydrophilic monomer and the alkyl (meth)acrylate being copolymerized in a weight ratio in the range of 40-70: 60-30;

the acrylic copolymer having a weight-average molecular weight in the range of 500 to 50000.

A second emulsion pressure-sensitive adhesive according to the present invention comprises an aqueous medium and a (co)polymer dispersed in the aqueous medium, the (co)polymer being obtained by (co)polymerizing a main monomer in the presence of a protective colloid, the protective colloid being an acrylic copolymer comprising:

(A-1) at least one hydrophilic monomer selected from the group consisting of acrylamide, methacrylamide, hydroxyethyl acrylate and hydroxyethyl methacrylate;

(B-1) an alkyl (meth)acrylate that is copolymerizable with the hydrophilic monomer (A-1) and whose alkyl group has 4 to 18 carbon atoms; and (C) a third monomer being acrylonitrile and/or styrene;

the hydrophilic monomer, the alkyl (meth)acrylate and the third monomer being copolymerized in a weight ratio (A-1): [(B-1)+(C)] in the range of 40-70:60-30 and in a weight ratio (B-1):(C) in the range of 99.9-20:0.1-80;

the acrylic copolymer having a weight-average molecular weight in the range of 500 to 50000.

A third emulsion pressure-sensitive adhesive according to the present invention comprises an aqueous medium and a (co)polymer dispersed in the aqueous medium, the (co)polymer being obtained by (co)polymerizing a main monomer in the presence of a protective colloid, the protective colloid being an acrylic copolymer comprising:

(A-2) a hydrophilic monomer being acrylic acid and/or methacrylic acid; and (B-2) an alkyl (meth)acrylate that is copolymerizable with the hydrophilic monomer (A-2) and whose alkyl group has 4 to 9 carbon atoms;

the hydrophilic monomer and the alkyl (meth)acrylate being copolymerized in a weight ratio in the range of 40-70: 60-30;

the acrylic copolymer having a weight-average molecular weight in the range of 500 to 50000.

A fourth emulsion pressure-sensitive adhesive according to the present invention comprises an aqueous medium and a (co)polymer dispersed in the aqueous medium, the (co)polymer being obtained by (co)polymerizing a main monomer in the presence of a protective colloid, the protective colloid being an acrylic copolymer comprising:

(A-2) a hydrophilic monomer being acrylic acid and/or methacrylic acid;

(B-2) an alkyl (meth)acrylate that is copolymerizable with the hydrophilic monomer (A-2) and whose alkyl group has 4 to 9 carbon atoms; and (C) a third monomer being acrylonitrile and/or styrene;

the hydrophilic monomer, the alkyl (meth)acrylate and the third monomer being copolymerized in a weight ratio (A-2): [(B-2)+(C)] in the range of 40-70:60-30 and in a weight ratio (B-2):(C) in the range of 99.9-20:0.1-80;

the acrylic copolymer having a weight-average molecular weight in the range of 500 to 50000.

In the first to fourth processes for producing an emulsion pressure-sensitive adhesive, the pressure-sensitive adhesives obtained by (co)polymerizing a main monomer in the presence of the protective colloid generally have a glass transition temperature (Tg) of not more than 0° C.

(Co)polymerization of a main monomer using the above protective colloid can achieve very high dispersion stability of the monomer and resulting polymer dispersed in the aqueous medium. Moreover, the pressure-sensitive adhesive of the present invention obtained as described above shows superior adhesive property to wet surfaces in spite of being an emulsion type adhesive.

DETAILED DESCRIPTION OF THE INVENTION

Hereinbelow, the processes for producing an emulsion pressure-sensitive adhesive according to the present invention will be described in detail.

The production processes of an emulsion pressure-sensitive adhesive perform (co)polymerization of a main monomer with use of a specific protective colloid.

The first and second processes for producing an emulsion pressure-sensitive adhesive carry out (co)polymerization of a main monomer in the presence of a specific protective colloid as described below.

The protective colloid used herein is an acrylic copolymer composed of a specific hydrophilic monomer (A-1) and a specific alkyl (meth)acrylate (B-1).

The hydrophilic monomer (A-1) is at least one monomer selected from the group consisting of acrylamide (AM), methacrylamide, hydroxyethyl acrylate (HEA) and hydroxyethyl methacrylate (HEMA). These hydrophilic monomers may be used singly or in arbitrary combination.

The alkyl (meth)acrylate (B-1) copolymerized with the hydrophilic monomer (A-1) to form the protective colloid is an alkyl (meth)acrylate (B-1) that is copolymerizable with the hydrophilic monomer (A-1) and whose alkyl group has 4 to 18 carbon atoms, preferably 4 to 8 carbon atoms. Examples of such alkyl (meth)acrylates (B-1) include alkyl (meth)acrylates having a linear alkyl group, such as butyl (meth)acrylate, pentyl (meth)acrylate, hexyl (meth)acrylate, octyl (meth)acrylate, nonyl (meth)acrylate, decyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate and octadecyl (meth)acrylate; and alkyl (meth)acrylates having a branched alkyl group, such as 2-ethylhexyl (meth)acrylate, isooctyl (meth)acrylate and t-butyl (meth)acrylate. These alkyl (meth)acrylates (B-1) may be used singly or in combination. Particularly, the present invention preferably employs the alkyl (meth)acrylates having a branched alkyl group, especially 2-ethylhexyl (meth)acrylate and isooctyl acrylate.

Moreover, the protective colloid used in the present invention may be an acrylic copolymer obtained by copolymerizing the hydrophilic monomer (A-1), the alkyl (meth)acrylate (B-1) whose alkyl group has 4 to 18 carbon atoms, and further a third monomer (C) being vinyl acetate and/or styrene.

The use of copolymers constituting the hydrophilic monomer (A-1) and the alkyl (meth)acrylate (B-1) as protective colloid permits the monomer used for preparation of the pressure-sensitive adhesive and the resulting pressure-sensitive adhesive to exhibit dispersibility, and also permits the pressure-sensitive adhesive obtained to exert good adhesive property to wet surfaces.

When the protective colloid is an acrylic copolymer composed of the hydrophilic monomer (A-1) and the alkyl (meth)acrylate (B-1), production of the copolymer involves the hydrophilic monomer (A-1) and the alkyl (meth)acrylate (B-1) in a weight ratio in the range of 40-70:60-30, preferably 60-70:40-30 (the total is 100 parts by weight). The use of the hydrophilic monomer (A-1)/alkyl (meth)acrylate (B-1) copolymer having the above weight ratio as protective colloid permits the main monomer for forming a pressure-sensitive adhesive and the resulting pressure-sensitive adhesive to stably disperse in the aqueous medium, and also permits the pressure-sensitive adhesive obtained using the protective colloid to exert good adhesive property to wet surfaces. The hydrophilic monomer (A-1) and the alkyl (meth)acrylate (B-1) for forming the protective colloid are monomers of high reactivity, and the amounts in which the monomers are charged are approximately consistent with the composition of the copolymer obtained. For example, when acrylamide (AM) and 2-ethylhexyl acrylate (2EHA), which are preferable monomers in the present invention, are charged in a weight ratio of 60:40, the resultant copolymer will have a composition (weight ratio) of 60:40 in accordance with the charged weight ratio.

When the protective colloid is a specific acrylic copolymer composed of the hydrophilic monomer (A-1), the specific alkyl (meth)acrylate (B-1) and the third monomer (C), the acrylic copolymer for use has a weight ratio [(hydrophilic monomer (A-1)):(specific alkyl (meth)acrylate (B-1)+third monomer (C))] in the range of 40-70:60-30, preferably 60-70:40-30 (the total is 100 parts by weight), and a weight ratio [specific alkyl (meth)acrylate (B-1):third monomer (C)] in the range of 99.9-20:0.1-80, preferably 99.9-40:0.1-60 (the total is 100 parts by weight). The use of the third monomer (C) in the above amount improves polymerization stability for the acrylic copolymer that forms the protective colloid. Any amount of (C) exceeding 80 wt % relative to the sum of (B-1) and (C) results in bad polymerization stability, and is not preferable.

The third and fourth processes for producing an emulsion pressure-sensitive adhesive carry out (co)polymerization of a main monomer in the presence of a specific protective colloid.

The protective colloid used herein is an acrylic copolymer composed of a specific hydrophilic monomer (A-2) and a specific alkyl (meth)acrylate (B-2).

The hydrophilic monomer (A-2) is acrylic acid (AA) and/or methacrylic acid (MA). That is, the hydrophilic monomer (A-2) may be a single one of acrylic acid (AA) and methacrylic acid (MA) or may be a combination of acrylic acid (AA) and methacrylic acid (MA). When the hydrophilic monomer (A-2) is a combination of acrylic acid (AA) and methacrylic acid (MA), acrylic acid (AA) and methacrylic acid (MA) may be used in an arbitrary ratio.

The alkyl (meth)acrylate (B-2) copolymerized with the hydrophilic monomer (A-2) to form the protective colloid is an alkyl (meth)acrylate (B-2) that is copolymerizable with the hydrophilic monomer (A-2) and whose alkyl group has 4 to 9 carbon atoms, preferably 4 to 8 carbon atoms. Examples of such alkyl (meth)acrylates (B-2) include alkyl (meth)acrylates having an alkyl group, such as butyl (meth)acrylate, pentyl (meth)acrylate, hexyl (meth)acrylate, octyl (meth)acrylate and nonyl (meth)acrylate; and alkyl (meth)acrylates having a branched alkyl group, such as 2-ethylhexyl (meth)acrylate, isooctyl (meth)acrylate and t-butyl (meth)acrylate. These alkyl (meth)acrylates may be used singly or in combination. Particularly, the present invention preferably employs the alkyl (meth)acrylates having a branched alkyl group, especially 2-ethylhexyl (meth)acrylate, t-butyl acrylate and isooctyl acrylate.

The protective colloid used in the present invention may be an acrylic copolymer obtained by copolymerizing the hydrophilic monomer (A-2), the alkyl (meth)acrylate (B-2) whose alkyl group has 4 to 9 carbon atoms, and further a third monomer (C) being vinyl acetate and/or styrene.

The use of copolymers constituting the hydrophilic monomer (A-2) and the alkyl (meth)acrylate (B-2) as protective colloid permits the monomer used for preparation of pressure-sensitive adhesive and the resulting pressure-sensitive adhesive to exhibit dispersibility, and also permits the pressure-sensitive adhesive obtained to exert good adhesive property to wet surfaces.

When the protective colloid is an acrylic copolymer composed of the hydrophilic monomer (A-2) and the alkyl (meth)acrylate (B-2), production of the copolymer involves the hydrophilic monomer (A-2) and the alkyl (meth)acrylate (B-2) in a weight ratio in the range of 40-70:60-30, preferably 60-70:40-30 (the total is 100 parts by weight). The use of the hydrophilic monomer (A-2)/alkyl (meth)acrylate (B-2) copolymer having the above weight ratio as protective colloid permits the main monomer for forming a pressure-sensitive adhesive and the resulting pressure-sensitive adhesive to stably disperse in the aqueous medium, and also permits the pressure-sensitive adhesive obtained using the protective colloid to exert good adhesive property to wet surfaces. The hydrophilic monomer (A-2) and the alkyl (meth)acrylate (B-2) for forming the protective colloid are monomers of high reactivity, and the amounts in which the monomers are charged are approximately consistent with the composition of the copolymer obtained. For example, when acrylic acid (AA) and 2-ethylhexyl acrylate (2EHA), which are preferable monomers in the present invention, are charged in a weight ratio of 60:40, the resultant copolymer will have a composition (weight ratio) of 60:40 in accordance with the charged weight ratio.

When the protective colloid is a specific acrylic copolymer composed of the hydrophilic monomer (A-2), the specific alkyl (meth)acrylate (B-2) and the third monomer (C), the acrylic copolymer for use has a weight ratio [(hydrophilic monomer (A-2)):(specific alkyl (meth)acrylate (B-2)+third monomer (C))] in the range of 40-70:60-30, preferably 60-70: 40-30 (the total is 100 parts by weight), and a weight ratio [specific alkyl (meth)acrylate (B-2):third monomer (C)] in the range of 99.9-20:0.1-80, preferably 99.9-40:0.1-60 (the total is 100 parts by weight). The use of the third monomer (C) in the above amount improves polymerization stability for the acrylic copolymer that forms the protective colloid. Any amount of the third monomer (C) exceeding 80 wt % results in bad polymerization stability, and is not preferable.

The copolymer that forms the protective colloid used in the production process of an emulsion pressure-sensitive adhesive of the present invention has a weight-average molecular weight in the range of 500 to 50000, preferably in the range of 500 to 10000. The use of the copolymer having this weight-average molecular weight as protective colloid permits the main monomer for a pressure-sensitive adhesive and the resulting pressure-sensitive adhesive to disperse favorably in the aqueous medium.

The copolymer for forming the protective colloid may be produced by dispersing and copolymerizing the hydrophilic monomer (A-1) or (A-2) and the alkyl (meth)acrylate (B-1) or (B-2) in an aqueous medium. A surface active agent is used in dispersing the hydrophilic monomer (A-1) or (A-2) and the alkyl (meth)acrylate (B-1) or (B-2). The surface active agent used herein may be any of anionic, cationic, nonionic and amphionic. The present invention preferably employs anionic or nonionic surface active agents. These surface active agents may be used singly or in combination. The amount of surface active agent is generally in the range of 30 to 100 parts by weight, preferably 50 to 80 parts by weight per 100 parts by weight of the total of the hydrophilic monomer (A-1) or (A-2) and the alkyl (meth)acrylate (B-1) or (B-2).

The present invention may employ a dispersant together with or without the surface active agent. Examples of the dispersants for use in the present invention include water-soluble high molecular weight compounds such as polyvinyl alcohols.

The amount of dispersant is generally not more than 200 parts by weight, preferably in the range of 50 to 150 parts by weight per 100 parts by weight of the total of the hydrophilic monomer (A-1) or (A-2) and the alkyl (meth)acrylate (B-1) or (B-2).

Formation of the protective colloid involves a polymerization initiator. Examples of the polymerization initiators for use in production of the protective colloid include persulfate compounds such as ammonium persulfate, sodium persulfate and potassium persulfate, hydrogen peroxide, azobis compounds and organic peroxides. The amount of reaction initiator is generally not more than 5 parts by weight, preferably in the range of 2 to 4 parts by weight per 100 parts by weight of the total of the hydrophilic monomer (A-1) or (A-2) and the alkyl (meth)acrylate (B-1) or (B-2).

Further, production of the protective colloid preferably involves use of a chain transfer agent. Examples of the chain transfer agents for use in the present invention include n-dodecyl mercaptan, butyl mercaptan, 3-mercaptopropionic acid, thioglycolic acid, and thioglycolic acid esters. The amount of chain transfer agent is generally not more than 10 parts by weight, preferably in the range of 0.01 to 2 parts by weight per 100 parts by weight of the total of the hydrophilic monomer (A-1) or (A-2) and the alkyl (meth)acrylate (B-1) or (B-2).

The protective colloid may be produced by dispersing and copolymerizing the hydrophilic monomer (A-1) or (A-2) and the alkyl (meth)acrylate (B-1) or (B-2) in an aqueous medium. The reaction temperature is generally in the range of 60 to 90° C., preferably 70 to 85° C., and the reaction time under the above condition is generally from 5 to 30 minutes, preferably 10 to 20 minutes.

The above reaction yields a dispersion of the protective colloid in the aqueous medium. The protective colloid may be used after being separated from the aqueous medium or may be used as dispersed in the aqueous medium.

In the production processes of an emulsion pressure-sensitive adhesive of the present invention, a main monomer is (co)polymerized using any of the protective colloids obtained as described hereinabove.

The main monomer for use in the present invention is one that can be dispersed in the aqueous medium by the protective colloid. Examples of the monomers employable in the present invention include those having a polymerizable unsaturated bond. The monomers having a polymerizable unsaturated bond are based on alkyl acrylates, and examples of such monomers having a polymerizable unsaturated bond include the following compounds:

alkyl acrylates such as methyl acrylate, ethyl acrylate, propyl acrylate, butyl acrylate, pentyl acrylate, hexyl acrylate, 2-ethylhexyl acrylate, octyl acrylate, nonyl acrylate, decyl acrylate and dodecyl acrylate;

aryl acrylates such as phenyl acrylate and benzyl acrylate;

alkoxyalkyl acrylates such as methoxyethyl acrylate, ethoxyethyl acrylate, propoxyethyl acrylate, butoxyethyl acrylate and ethoxypropyl acrylate;

acrylic acid and salts such as alkali metal salts of acrylic acid;

methacrylic acid and salts such as alkali metal salts of methacrylic acid;

alkyl methacrylates such as methyl methacrylate, ethyl methacrylate, propyl methacrylate, butyl methacrylate, pentyl methacrylate, hexyl methacrylate, 2-ethylhexyl methacrylate, octyl methacrylate, nonyl methacrylate, decyl methacrylate and dodecyl methacrylate;

aryl methacrylates such as phenyl methacrylate and benzyl methacrylate;

alkoxyalkyl methacrylates such as methoxyethyl methacrylate, ethoxyethyl methacrylate, propoxyethyl methacrylate, butoxyethyl methacrylate and ethoxypropyl methacrylate;

(poly)alkylene glycol diacrylates such as ethylene glycol diacrylate, diethylene glycol diacrylate, triethylene glycol diacrylate, polyethylene glycol diacrylate, propylene glycol diacrylate, dipropylene glycol diacrylate and tripropylene glycol diacrylate;

(poly)alkylene glycol dimethacrylates such as ethylene glycol dimethacrylate, diethylene glycol dimethacrylate, triethylene glycol dimethacrylate, polyethylene glycol dimethacrylate, propylene glycol dimethacrylate, dipropylene glycol dimethacrylate and tripropylene glycol dimethacrylate;

polyacrylates such as trimethylolpropane triacrylate;

polymethacrylates such as trimethylolpropane trimethacrylate;

acrylonitriles;

methacrylonitriles;

vinyl acetate;

vinylidene chloride;

halogenated vinyl compounds such as 2-chloroethyl acrylate and 2-chloroethyl methacrylate;

acrylates of alicyclic alcohols such as cyclohexyl acrylate;

methacrylates of alicyclic alcohols such as cyclohexyl methacrylate;

oxazoline group-containing polymerizable compounds such as 2-vinyl-2-oxazoline, 2-vinyl-5-methyl-2-oxazoline and 2-isopropenyl-2-oxazoline;

aziridine group-containing polymerizable compounds such as acryloylaziridine, methacryloylaziridine, 2-aziridinylethyl acrylate and 2-aziridinylethyl methacrylate;

epoxy group-containing vinyl monomers such as allyl glycidyl ether, glycidyl acrylate, glycidyl methacrylate, 2-ethylglycidyl acrylate and 2-ethylglycidyl methacrylate;

hydroxyl group-containing vinyl compounds such as 2-hydroxyethyl acrylate, 2-hydroxyethyl methacrylate, 2-hydroxypropyl acrylate, monoesters of acrylic or methacrylic acid with polypropylene glycol or polyethylene glycol, and adducts of 2-hydroxyethyl (meth)acrylate with lactones;

fluorine-containing vinyl monomers such as fluorine-substituted alkyl methacrylates and fluorine-substituted alkyl acrylates;

unsaturated carboxylic acids such as itaconic acid, crotonic acid, maleic acid and fumaric acid (excluding (meth)acrylic acid), salts thereof, (partially) esterified compounds thereof and anhydrides thereof;

reactive halogen-containing vinyl monomers such as 2-chloroethyl vinyl ether and vinyl monochloroacetate;

amide group-containing vinyl monomers such as methacrylamide, N-methylolmethacrylamide, N-methoxyethylmethacrylamide and N-butoxymethylmethacrylamide;

organosilicon group-containing vinyl monomers such as vinyltrimethoxysilane, γ-methacryloxypropyltrimethoxysilane, allyltrimethoxysilane, trimethoxysilylpropylallylamine and 2-methoxyethoxytrimethoxysilane; and macromonomers being vinyl polymers having a radically polymerizable vinyl group at its end (e.g., fluorine-type macromonomers, silicone-containing macromonomers and styrene-type macromonomers).

These monomers may be used singly or in combination.

In the present invention, particularly, the monomers are used in combination such that the resulting (co)polymer has a glass transition temperature (Tg) of not more than 0° C., preferably in the range of −85 to 0° C. For example, a preferable combination consists of 2-ethylhexyl acrylate (2EHA), acrylic acid (AA) and acrylonitrile (AN) (for example in 96:2:2).

The main monomers are dispersed in an aqueous medium containing a small amount of surface active agent to give a monomer emulsion. The surface active agent used herein may be any of anionic, cationic, nonionic, amphionic and reactive surface active agents. The present invention preferably employs anionic or nonionic surface active agents. These surface active agents may be used singly or in combination. The amount of surface active agent is generally in the range of 0.1 to 5 parts by weight, preferably 0.5 to 1.5 parts by weight per 100 parts by weight of the main monomers combined. The aqueous medium used herein is generally water, and the amount of aqueous medium is generally in the range of 10 to 100 parts by weight, preferably 25 to 50 parts by weight per 100 parts by weight of the main monomer(s).

The monomer emulsion obtained as described above is slowly added dropwise to the protective colloidal dispersion with stirring, and the reaction liquid is generally heated to 60 to 90° C., preferably 70 to 85° C. to react the main monomers. Under this temperature, the reaction of main monomers will require 2 to 6 hours, preferably 2 to 4 hours.

The main monomers are reacted under the above conditions to form particles of pressure-sensitive adhesive. Specifically, the pressure-sensitive adhesive obtained by the reaction under the above conditions generally ranges in GPC weight-average molecular weight from 200000 to 1200000, preferably from 500000 to 800000. The protective colloid adheres to the peripheral surface of pressure-sensitive adhesive particles and is unified with the pressure-sensitive adhesive particles, and the particles stably disperse in the aqueous medium.

The pressure-sensitive adhesive particles in the aqueous medium generally range in average particle diameter from 0.3 to 2.0 µm, preferably from 0.5 to 1.0 µm, and they disperse stably in the aqueous medium.

The reaction liquid containing the pressure-sensitive adhesive particles is cooled to room temperature. Although the dispersion is ready for use, it is preferable to add a small amount of surface active agent to the aqueous dispersion of the pressure-sensitive adhesive particles. The surface active agents for use herein include anionic surface active agents such as phosphate-based surface active agents. The amount of surface active agent is generally not more than 5 parts by weight, preferably in the range of 1.0 to 3.0 parts by weight per 100 parts by weight of the pressure-sensitive adhesive particles obtained. The use of the surface active agent in this amount permits the pressure-sensitive adhesive particles formed to disperse more stably in the aqueous medium and does not deteriorate the adhesive property to wet surfaces of the resulting pressure-sensitive adhesive.

In the pressure-sensitive adhesive particles thus obtained, the copolymer of the protective colloid adheres to the periphery of the pressure-sensitive adhesive particles of the main monomers; the copolymer is unified with the pressure-sensitive adhesive particles of the main monomers and mainly exists on the surface of the pressure-sensitive adhesive particles. The copolymer of the protective colloid that exists on the surface, and the optionally added surface active agent, work to permit the pressure-sensitive adhesive particles to disperse stably in the aqueous medium. Meanwhile, the deep parts under the surface of the pressure-sensitive adhesive particles are composed of the pressure-sensitive adhesive having good adhesion and preferably having a glass transition temperature (Tg) of not more than 0° C., and the deep parts provide good adhesive properties. Further, when the pressure-sensitive adhesive of the present invention is applied to a wet surface, the copolymer of the protective colloid on the surface of the pressure-sensitive adhesive particles absorbs water on an adherend to prevent the water from adversely affecting the adhesive property of the pressure-sensitive adhesive. Accordingly, the pressure-sensitive adhesive obtained by the process of the present invention shows superior adhesive property to wet surfaces.

The pressure-sensitive adhesive can be favorably applied to an adherend and be peeled and applied again to an adherend, namely, the pressure-sensitive adhesive is excellent in adhesive properties (re-adhesive or re-peeling properties). It is unlikely that the peeling results in contamination of the adherend surface by residue of the pressure-sensitive adhesive to the adherend.

The pressure-sensitive adhesives obtained by the processes of the present invention are generally in the form of an aqueous emulsion. This aqueous emulsion may be used directly or may be applied on a support such as a polyester film and be dehydrated for use as a pressure-sensitive adhesive tape. Applying the aqueous emulsion on both sides of a support followed by dehydration provides use as a double sided pressure-sensitive adhesive tape. Furthermore, appropriate selection of a support on which the pressure-sensitive adhesive is applied enables use as an adhesive transfer tape, wherein a pressure-sensitive adhesive layer is formed on a support, the laminate consisting of the support and the pressure-sensitive adhesive layer is adhered to an adherend, then the pressure-sensitive adhesive layer of the laminate is transferred to the surface of adherend, and the support is peeled.

EXAMPLES

The present invention will be described with reference to the following examples, but it should be construed that the invention is in no way limited to the examples.

Example 1

A flask equipped with a stirrer, a reflux condenser and a dropping funnel was charged with, based on 40 parts by weight of water, 1 part by weight of a surface active agent, 1.5 parts by weight of acrylamide (AM), 1.0 part by weight of 2-ethylhexyl acrylate (2EHA), 0.1 part by weight of potassium persulfate (KPS) as an initiator, and 0.04 part by weight of n-dodecylmercaptane as chain transfer agent, followed by replacing the air in the flask with a nitrogen gas.

A separate container was charged with 40 parts by weight of water, and 0.5 part by weight of a surface active agent was dissolved therein. Subsequently, 93.5 parts by weight of 2-ethylhexyl acrylate (2EHA), 2 parts by weight of acrylic acid (AA) and 2 parts by weight of acrylonitrile (AN) were added to the solution to prepare a monomer emulsion.

The contents in the flask were heated to 75° C. with stirring and were heated at the temperature for 15 minutes to form a copolymer of acrylamide (AM) and 2-ethylhexyl acrylate (2EHA) (weight-average molecular weight: 1000). Thereafter, the monomer emulsion prepared as above was added dropwise at 75° C. over a period of 3 hours.

Further, reaction was completed at 80° C. in 2 hours, followed by cooling. Subsequently, 1.5 parts by weight of a phosphate-based surface active agent was added to prepare a polymer emulsion. The pressure-sensitive adhesive thus obtained had a glass transition temperature (Tg) of −67° C. and a weight-average molecular weight of 750000.

The composition of the polymer emulsion, and that of the protective colloid used are given in Table 1.

Example 2

A polymer emulsion was obtained in the same manner as in Example 1, except that a copolymer of protective colloid (weight-average molecular weight: 1100) was prepared using 1.5 parts by weight of 2-hydroxyethyl acrylate (HEA) in place of 1.5 parts by weight of acrylamide (AM). The pressure-sensitive adhesive obtained had a glass transition temperature (Tg) of −68° C. and a weight-average molecular weight of 800000.

The composition of the polymer emulsion, and that of the protective colloid used are given in Table 1.

Example 3

A polymer emulsion was obtained in the same manner as in Example 1, except that a copolymer of protective colloid (weight-average molecular weight: 900) was prepared using 0.5 part by weight of 2-ethylhexyl acrylate (2EHA) and 0.5 part by weight of styrene (St) in place of 1.0 part by weight of 2-ethylhexyl acrylate (2EHA). The pressure-sensitive adhesive obtained had a glass transition temperature (Tg) of −66° C. and a weight-average molecular weight of 800000.

The composition of the polymer emulsion, and that of the protective colloid used are given in Table 1.

Comparative Example 1

A polymer emulsion was obtained in the same manner as in Example 1, except that a copolymer of protective colloid (weight-average molecular weight: 1200) was prepared using 0.75 part by weight of acrylamide (AM) and 1.75 parts by weight of 2-ethylhexyl acrylate (2EHA) in place of 1.5 parts by weight of acrylamide (AM) and 1.0 part by weight of 2-ethylhexyl acrylate (2EHA). The pressure-sensitive adhesive obtained had a glass transition temperature (Tg) of −68° C. and a weight-average molecular weight of 800000.

The composition of the polymer emulsion, and that of the protective colloid used are given in Table 1.

Comparative Example 2

A polymer emulsion was obtained in the same manner as in Example 1, except that a copolymer of protective colloid (weight-average molecular weight: 1200) was prepared using 2 parts by weight of acrylamide (AM) and 0.5 part by weight of 2-ethylhexyl acrylate (2EHA) in place of 1.5 parts by weight of acrylamide (AM) and 1.0 part by weight of 2-ethylhexyl acrylate (2EHA). The pressure-sensitive adhesive obtained had a glass transition temperature (Tg) of −68° C. and a weight-average molecular weight of 850000.

The composition of the polymer emulsion, and that of the protective colloid used are given in Table 1.

Comparative Example 3

An attempt was made to obtain a polymer emulsion in the same manner as in Example 1, except that a copolymer of protective colloid (weight-average molecular weight: 700) was prepared using 0.1 part by weight of 2-ethylhexyl acrylate (2EHA) and 0.9 part by weight of styrene in place of 1.0 part by weight of 2-ethylhexyl acrylate (2EHA). The attempt resulted in an unstable polymer emulsion because of bad polymerization stability.

The composition of the protective colloid used is given in Table 1.

TABLE 1

| | Composition of protective colloid (weight ratio) | Composition of pressure-sensitive adhesive (weight ratio) |
|---|---|---|
| Ex. 1 | AM/2EHA = 60/40 | 2EHA/AA/AN = 93.5/2/2 |
| Ex. 2 | HEA/2EHA = 60/40 | 2EHA/AA/AN = 93.5/2/2 |
| Ex. 3 | AM/2EHA/St = 60/20/20 | 2EHA/AA/AN = 93.5/2/2 |
| Comp. Ex. 1 | AM/2EHA = 30/70 | 2EHA/AA/AN = 93.5/2/2 |
| Comp. Ex. 2 | AM/2EHA = 80/20 | 2EHA/AA/AN = 93.5/2/2 |
| Comp. Ex. 3 | AM/2EHA/St = 60/4/36 | — |

Examples 4-6 and Comparative Examples 4-6

A tape was fabricated in the following manner using each of the polymer emulsions obtained as described above (Examples 1-3 and Comparative Examples 1-3).

A 25 μm thick PET (polyethyleneterephthalate) film was coated with the emulsion in a coating thickness of 50 μm with use of doctor blade, followed by drying with an air fan at 100° C. for 3 minutes. The tape was taken out of the dryer, and release paper was applied to the pressure-sensitive adhesive layer of the tape to prepare a tape sample.

The sample was tested for adhesive strength to SUS in accordance with JIS-Z-0237.

Further, the tape was left adhered at 40° C. over a period of 7 days and was peeled to evaluate re-peeling properties and adherend-contaminating properties.

The results are given in Table 2.

TABLE 2

|  | Pressure sensitive adhesive | Adhesive strength | Re-peeling properties | Adherend contamination |
|---|---|---|---|---|
| Ex. 4 | Ex. 1 | 400 g/25 mm | Good | No |
| Ex. 5 | Ex. 2 | 300 g/25 mm | Good | No |
| Ex. 6 | Ex. 3 | 300 g/25 mm | Good | No |
| Comp. Ex. 4 | Comp. Ex. 1 | 200 g/25 mm | Bad | Yes |
| Comp. Ex. 5 | Comp. Ex. 2 | 450 g/25 mm | Bad | Yes |
| Comp. Ex. 6 | Comp. Ex. 3 | — | — | — |

Example 7

Test of Adhesive Property to Wet Surfaces

The pressure-sensitive adhesive tape samples obtained in Example 4 and Comparative Example 4 were evaluated for adhesive property to wet surfaces by the following method.

A 50 mm×70 mm glass plate was cooled in a 5° C. refrigerator for 1 hour.

The glass plate was taken out of the refrigerator and was left to stand at room temperature. When the surface had been wet, the tape sample was applied and was manually peeled by each of randomly selected five personnel to evaluate the peeling strength. The adhesive property to wet surfaces was evaluated by assigning scores as described below.

1: No adhesion was felt.

2: Adhesion was slightly felt.

3: Adhesion was markedly felt.

4: Strong adhesion was felt.

TABLE 3

|  | Tape sample of Example 4 | Tape sample of Comparative Example 4 |
|---|---|---|
| Personnel 1 | 3 | 1 |
| Personnel 2 | 3 | 1 |
| Personnel 3 | 2 | 1 |
| Personnel 4 | 4 | 2 |
| Personnel 5 | 3 | 1 |

The above evaluation results were statistically processed by t-test. The processing proved that the Example 4 tape that used the pressure-sensitive adhesive of Example 1 obtained by the process of the present invention had significance over the Comparative Example 4 tape that used the pressure-sensitive adhesive of Comparative Example 1, with a risk of 1%.

TABLE 4

|  | Variable 1 | Variable 2 |
|---|---|---|
| Average | 3 | 1.2 |
| Variance | 0.5 | 0.2 |
| Items observed | 5 | 5 |

TABLE 4-continued

|  | Variable 1 | Variable 2 |
|---|---|---|
| Total sum with theoretical average | 0 | |
| Degree of freedom | 7 | |
| T | 4.810702 | |
| P(T <= t) (one side) | 0.000971 | |
| t boundary value (one side) | 1.894578 | |
| P(T <= t) (both sides) | 0.001942 | |
| t boundary value (both sides) | 2.364623 | |

Example 8

A flask equipped with a stirrer, a reflux condenser and a dropping funnel was charged with, based on 40 parts by weight of water, 1 part by weight of a surface active agent, 1.5 parts by weight of acrylic acid (AA), 1.0 part by weight of 2-ethylhexyl acrylate (2EHA), 0.1 part by weight of potassium persulfate (KPS) as an initiator, and 0.04 part by weight of n-dodecylmercaptane as chain transfer agent, followed by replacing the air in the flask with a nitrogen gas.

A separate container was charged with 40 parts by weight of water, and 0.5 part by weight of a surface active agent was dissolved therein. Subsequently, 93.5 parts by weight of 2-ethylhexyl acrylate (2EHA), 2 parts by weight of acrylic acid (AA) and 2 parts by weight of acrylonitrile (AN) were added to the solution to prepare a monomer emulsion.

The contents in the flask were heated to 75° C. with stirring and were heated at the temperature for 15 minutes to form a copolymer of acrylic acid (AA) and 2-ethylhexyl acrylate (2EHA) (weight-average molecular weight: 800). Thereafter, the monomer emulsion prepared as above was added dropwise at 75° C. over a period of 3 hours.

Further, reaction was completed at 80° C. in 2 hours, followed by cooling. Subsequently, 1.5 parts by weight of a phosphate-based surface active agent was added to prepare a polymer emulsion.

The pressure-sensitive adhesive thus obtained had a glass transition temperature (Tg) of −67° C. and a weight-average molecular weight of 720000.

The composition of the polymer emulsion, and that of the protective colloid used are given in Table 5.

Example 9

A polymer emulsion was obtained in the same manner as in Example 8, except that a copolymer of protective colloid (weight-average molecular weight: 700) was prepared using 0.5 part by weight of 2-ethylhexyl acrylate (2EHA) and 0.5 part by weight of styrene (St) in place of 1.0 part by weight of 2-ethylhexyl acrylate (2EHA).

The pressure-sensitive adhesive obtained had a glass transition temperature (Tg) of −66° C. and an average molecular weight of 820000.

The composition of the polymer emulsion, and that of the protective colloid used are given in Table 5.

Comparative Example 7

A polymer emulsion was obtained in the same manner as in Example 8, except that a copolymer of protective colloid (weight-average molecular weight: 800) was prepared using 1 part by weight of acrylic acid (AA), 1 part by weight of n-butylacrylate (BA) and 0.5 part by weight of lauryl acrylate (LA) in place of 1.5 parts by weight of acrylic acid (AA) and 1.0 part by weight of 2-ethylhexyl acrylate (2EHA).

The pressure-sensitive adhesive obtained had a glass transition temperature (Tg) of −68° C. and a weight-average molecular weight of 550000.

The composition of the polymer emulsion, and that of the protective colloid used are given in Table 5.

Comparative Example 8

An attempt was made to obtain a polymer emulsion in the same manner as in Example 8, except that a copolymer of protective colloid (weight-average molecular weight: 600) was prepared using 0.1 part by weight of 2-ethylhexyl acrylate (2EHA) and 0.9 part by weight of styrene (St) in place of 1.0 part by weight of 2-ethylhexyl acrylate (2EHA). The attempt resulted in an unstable polymer emulsion having insufficient properties because of bad polymerization stability.

The composition of the protective colloid used is given in Table 5.

TABLE 5

| | Composition of protective colloid (weight ratio) | Composition of pressure-sensitive adhesive (weight ratio) |
| --- | --- | --- |
| Ex. 8 | AA/2EHA = 60/40 | 2EHA/AA/AN = 93.5/2/2 |
| Ex. 9 | AA/2EHA/St = 60/20/20 | 2EHA/AA/AN = 93.5/2/2 |
| Comp. Ex. 7 | AA/BA/LA = 40/40/20 | 2EHA/AA/AN = 93.5/2/2 |
| Comp. Ex. 8 | AA/2EHA/St = 60/4/36 | — |

Examples 10 and 11 and Comparative Examples 9 and 10

A tape was fabricated in the following manner using each of the polymer emulsions obtained as described above (Examples 8 and 9 and Comparative Examples 7 and 8).

A 25 μm thick PET (polyethyleneterephthalate) film was coated with the emulsion in a coating thickness of 50 μm with use of doctor blade, followed by drying with an air fan at 100° C. for 3 minutes. The tape was taken out of the dryer, and release paper was applied to the pressure-sensitive adhesive layer of the tape to prepare a tape sample.

The sample was tested for adhesive strength to SUS in accordance with JIS-Z-0237.

Further, the tape was left adhered at 40° C. over a period of 7 days and was peeled to evaluate re-peeling properties and adherend-contaminating properties.

The results are given in Table 6.

TABLE 6

| | Pressure sensitive adhesive | Adhesion strength | Re-peeling properties | Adherend contamination |
| --- | --- | --- | --- | --- |
| Ex. 10 | Ex. 8 | 400 g/25 mm | Good | No |
| Ex. 11 | Ex. 9 | 300 g/25 mm | Good | Very little |
| Comp. Ex. 9 | Comp. Ex. 7 | 200 g/25 mm | Bad | Yes |
| Comp. Ex. 10 | Comp. Ex. 8 | — | — | — |

Example 12

Test of Adhesive Property to Wet Surfaces

The pressure-sensitive adhesive tape samples obtained in Example 10 and Comparative Example 9 using the pressure-sensitive adhesives of Example 8 and Comparative Example 7, respectively, were evaluated for adhesive property to wet surfaces by the following method.

A 50 mm×70 mm glass plate was cooled in a 5° C. refrigerator for 1 hour.

The glass plate was taken out of the refrigerator and was left to stand at room temperature. When the surface had been wet, the tape sample was applied and was manually peeled by each of randomly selected five personnel to evaluate the peeling strength. The adhesive property to wet surfaces was evaluated by assigning scores as described below.

1: No adhesion was felt.

2: Adhesion was slightly felt.

3: Adhesion was markedly felt.

4: Strong adhesion was felt.

TABLE 7

| | Tape sample of Example 10 | Tape sample of Comparative Example 9 |
| --- | --- | --- |
| Personnel 1 | 3 | 1 |
| Personnel 2 | 3 | 1 |
| Personnel 3 | 2 | 2 |
| Personnel 4 | 4 | 2 |
| Personnel 5 | 3 | 1 |

The above evaluation results were statistically processed by t-test. The processing proved that the Example 10 tape that used the pressure-sensitive adhesive of Example 8 obtained by the process of the present invention had significance over the Comparative Example 9 tape that used the pressure-sensitive adhesive of Comparative Example 7, with a risk of 1%.

TABLE 8

| | Variable 1 | Variable 2 |
| --- | --- | --- |
| Average | 3 | 1.4 |
| Variance | 0.5 | 0.3 |
| Items observed | 5 | 5 |
| Total sum with theoretical average | 0 | |
| Degree of freedom | 8 | |
| T | 4 | |
| P(T <= t) (one side) | 0.001975 | |
| t boundary value (one side) | 1.859548 | |
| P(T <= t) (both sides) | 0.00395 | |
| t boundary value (both sides) | 2.306006 | |

The processes for producing a pressure-sensitive adhesive according to the present invention produce a pressure-sensitive adhesive in the presence of the specific protective colloid that is the specific copolymer composed of specific hydrophilic monomer (A-1) or (A-2) and specific alkyl (meth) acrylate (B-1) or (B-2) in a specific ratio, thus achieve excellent dispersion stability of the monomer and the resulting pressure-sensitive adhesive, and permits stable production of pressure-sensitive adhesive.

Further, the pressure-sensitive adhesive obtained by the present processes shows good adhesive property to adherends. Furthermore, it can be favorably applied to an adherend and be peeled and applied again to an adherend, and it is unlikely that the peeling results in contamination of the adherend surface by residue of the pressure-sensitive adhesive to the adherend surface.

Further, according to the processes of the present invention, a pressure-sensitive adhesive is produced in an aqueous medium in the presence of the specific protective colloid. The copolymer of the protective colloid adheres to the surface of the resulting pressure-sensitive adhesive particles, and absorbs water on an adherend surface. Therefore, the pressure-sensitive adhesive obtained in accordance with the present invention shows superior adhesive property even to wet surfaces. That is, the pressure-sensitive adhesive of the present invention exhibits superior adhesive property even to wet surfaces in spite of being an emulsion type containing an aqueous medium.

What is claimed is:

1. A process for producing an emulsion pressure-sensitive adhesive, which process comprises (co)polymerizing a monomer having a polymerizable unsaturated bond based on alkyl acrylates as a main component in an aqueous medium containing a surface active agent in the presence of a protective colloid, the protective colloid being an acrylic copolymer consisting essentially of:
 (A-1) at least one hydrophilic monomer selected from the group consisting of acrylamide, methacrylamide, hydroxyethyl acrylate and hydroxyethyl methacrylate;
 (B-1) an alkyl (meth)acrylate that is copolymerizable with the hydrophilic monomer (A-1) and whose alkyl group has 4 to 18 carbon atoms; and
 (C) a third monomer being acrylonitrile and/or styrene;
 the hydrophilic monomer, the alkyl (meth)acrylate and the third monomer being copolymerized in a weight ratio (A-1):[(B-1)+(C)] in the range of 40-70:60-30 and in a weight ratio (B-1):(C) in the range of 99.9-20:0.1-80;
 the acrylic copolymer having a weight-average molecular weight in the range of 500 to 50000.

2. A process for producing an emulsion pressure-sensitive adhesive, which process comprises (co)polymerizing a monomer having a polymerizable unsaturated bond based on alkyl acrylates as a main component in an aqueous medium containing a surface active agent in the presence of a protective colloid, the protective colloid being an acrylic copolymer consisting of:
 (A-2) a hydrophilic monomer being acrylic acid and/or methacrylic acid; and
 (B-2) an alkyl (meth)acrylate that is copolymerizable with the hydrophilic monomer (A-2) and whose alkyl group has 4 to 9 carbon atoms;
 the hydrophilic monomer and the alkyl (meth)acrylate being copolymerized in a weight ratio in the range of 40-70:60-30;
 the acrylic copolymer having a weight-average molecular weight in the range of 500 to 50000.

3. A process for producing an emulsion pressure-sensitive adhesive, which process comprises (co)polymerizing a monomer having a polymerizable unsaturated bond based on alkyl acrylates as a main component in an aqueous medium containing a surface active agent in the presence of a protective colloid, the protective colloid being an acrylic copolymer consisting of:
 (A-2) a hydrophilic monomer being acrylic acid and/or methacrylic acid;
 (B-2) an alkyl (meth)acrylate that is copolymerizable with the hydrophilic monomer (A-2) and whose alkyl group has 4 to 9 carbon atoms; and
 (C) a third monomer being acrylonitrile and/or styrene;
 the hydrophilic monomer, the alkyl (meth)acrylate and the third monomer being copolymerized in a weight ratio (A-2):[(B-2)+(C)] in the range of 40-70:60-30 and in a weight ratio (B-2):(C) in the range of 99.9-20:0.1-80;
 the acrylic copolymer having a weight-average molecular weight in the range of 500 to 50000.

4. An emulsion pressure-sensitive adhesive comprising an aqueous medium and a (co)polymer dispersed in the aqueous medium, the (co)polymer being obtained by (co)polymerizing a monomer having a polymerizable unsaturated bond based on alkyl acrylates as a main component in an aqueous medium containing a surface active agent in the presence of a protective colloid, the protective colloid being an acrylic copolymer consisting essentially of:
 (A-1) at least one hydrophilic monomer selected from the group consisting of acrylamide, methacrylamide, hydroxyethyl acrylate and hydroxyethyl methacrylate;
 (B-1) an alkyl (meth)acrylate that is copolymerizable with the hydrophilic monomer (A-1) and whose alkyl group has 4 to 18 carbon atoms; and
 (C) a third monomer being acrylonitrile and/or styrene;
 the hydrophilic monomer, the alkyl (meth)acrylate and the third monomer being copolymerized in a weight ratio (A-1):[(B-1)+(C)] in the range of 40-70:60-30 and in a weight ratio (B-1):(C) in the range of 99.9-20:0.1-80;
 the acrylic copolymer having a weight-average molecular weight in the range of 500 to 50000.

5. An emulsion pressure-sensitive adhesive comprising an aqueous medium and a (co)polymer dispersed in the aqueous medium, the (co)polymer being obtained by (co)polymerizing a monomer having a polymerizable unsaturated bond based on alkyl acrylates as a main component in an aqueous medium containing a surface active agent in the presence of a protective colloid, the protective colloid being an acrylic copolymer consisting of:
 (A-2) a hydrophilic monomer being acrylic acid and/or methacrylic acid; and
 (B-2) an alkyl (meth)acrylate that is copolymerizable with the hydrophilic monomer (A-2) and whose alkyl group has 4 to 9 carbon atoms;
 the hydrophilic monomer and the alkyl (meth)acrylate being copolymerized in a weight ratio in the range of 40-70:60-30;
 the acrylic copolymer having a weight-average molecular weight in the range of 500 to 50000.

6. An emulsion pressure-sensitive adhesive comprising an aqueous medium and a (co)polymer dispersed in the aqueous medium, the (co)polymer being obtained by (co)polymerizing a monomer having a polymerizable unsaturated bond based on alkyl acrylates as a main component in an aqueous medium containing a surface active agent in the presence of a protective colloid, the protective colloid being an acrylic copolymer consisting of:
 (A-2) a hydrophilic monomer being acrylic acid and/or methacrylic acid;
 (B-2) an alkyl (meth)acrylate that is copolymerizable with the hydrophilic monomer (A-2) and whose alkyl group has 4 to 9 carbon atoms; and
 (C) a third monomer being acrylonitrile and/or styrene;
 the hydrophilic monomer, the alkyl (meth)acrylate and the third monomer being copolymerized in a weight ratio (A-2):[(B-2)+(C)] in the range of 40-70:60-30 and in a weight ratio (B-2):(C) in the range of 99.9-20:0.1-80;
 the acrylic copolymer having a weight-average molecular weight in the range of 500 to 50000.

7. The process for producing an emulsion pressure-sensitive adhesive according to claim 1, wherein (co)polymerization in the presence of the protective colloid produces a pressure-sensitive adhesive having a glass transition temperature (Tg) of not more than 0° C.

8. The process for producing an emulsion pressure-sensitive adhesive according to claim 2, wherein (co)polymerization in the presence of the protective colloid produces a pressure-sensitive adhesive having a glass transition temperature (Tg) of not more than 0° C.

9. The process for producing an emulsion pressure-sensitive adhesive according to claim 3, wherein (co)polymerization in the presence of the protective colloid produces a pressure-sensitive adhesive having a glass transition temperature (Tg) of not more than 0° C.

10. The emulsion pressure-sensitive adhesive according to claim 4, wherein the pressure-sensitive adhesive comprising the (co)polymer has a glass transition temperature (Tg) of not more than 0° C.

11. The emulsion pressure-sensitive adhesive according to claim 5, wherein the pressure-sensitive adhesive comprising the (co)polymer has a glass transition temperature (Tg) of not more than 0° C.

12. The emulsion pressure-sensitive adhesive according to claim 6, wherein the pressure-sensitive adhesive comprising the (co)polymer has a glass transition temperature (Tg) of not more than 0° C.

* * * * *

UNITED STATES PATENT AND TRADEMARK OFFICE
CERTIFICATE OF CORRECTION

PATENT NO. : 7,608,656 B2
APPLICATION NO. : 12/028984
DATED : October 27, 2009
INVENTOR(S) : Takashima It is certified that error appears in the above-identified patent and that said Letters Patent is hereby corrected as shown below:

Title page, Item (12) "United States Patent Saitama"
should read (12) -- United States Patent Takashima --

Title page, Item (73) Inventor "Kiyokuni Saitama" should read
-- Kiyokuni Takashima --

Signed and Sealed this

Twenty-third Day of February, 2010

David J. Kappos
*Director of the United States Patent and Trademark Office*